United States Patent
Hu et al.

(10) Patent No.: US 11,472,942 B2
(45) Date of Patent: Oct. 18, 2022

(54) FLEXIBLE WRAPPING MATERIAL FOR PRESERVING FOOD FRESHNESS

(71) Applicant: Dow Global Technologies LLC, Midland, MI (US)

(72) Inventors: Minbiao Hu, Shanghai (CN); Tong Sun, Shanghai (CN); Dong Yun, Shanghai (CN); Wei Li, Shanghai (CN); Xudong Huang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 409 days.

(21) Appl. No.: 16/757,877

(22) PCT Filed: Oct. 25, 2017

(86) PCT No.: PCT/CN2017/107609
§ 371 (c)(1),
(2) Date: Apr. 21, 2020

(87) PCT Pub. No.: WO2019/079993
PCT Pub. Date: May 2, 2019

(65) Prior Publication Data
US 2020/0339779 A1    Oct. 29, 2020

(51) Int. Cl.
| | | |
|---|---|---|
| *C08K 5/053* | (2006.01) | |
| *C08G 18/10* | (2006.01) | |
| *C08G 18/32* | (2006.01) | |
| *C08G 18/48* | (2006.01) | |
| *C08G 18/70* | (2006.01) | |
| *C08K 3/08* | (2006.01) | |

(52) U.S. Cl.
CPC ............ *C08K 5/053* (2013.01); *C08G 18/10* (2013.01); *C08G 18/3206* (2013.01); *C08G 18/4833* (2013.01); *C08G 18/706* (2013.01); *C08K 3/08* (2013.01); *C08K 2003/0812* (2013.01)

(58) Field of Classification Search
None
See application file for complete search history.

(56) References Cited

U.S. PATENT DOCUMENTS

| | | | |
|---|---|---|---|
| 2006/0142529 A1* | 6/2006 | Thiede | C08G 18/10 528/44 |
| 2013/0060216 A1 | 3/2013 | Junginger et al. | |
| 2015/0087737 A1* | 3/2015 | Srivastava | C08G 18/7671 521/159 |
| 2015/0197389 A1 | 7/2015 | Bao et al. | |
| 2016/0376263 A1* | 12/2016 | Patron | C07D 413/14 514/784 |
| 2017/0087199 A1* | 3/2017 | Patron | A61K 36/67 |
| 2017/0096418 A1* | 4/2017 | Patron | A23L 2/52 |

FOREIGN PATENT DOCUMENTS

| | | |
|---|---|---|
| AU | 198286426 | 3/1983 |
| AU | 656562 B2 | 2/1995 |
| AU | 2002251838 B2 | 2/2007 |
| CA | 1335873 C | 6/1995 |
| CA | 2667503 | 5/2008 |
| CN | 101633629 | 1/2010 |
| CN | 102827464 | 12/2012 |
| CN | 103614108 | 3/2014 |
| CN | 103723379 | 4/2014 |
| CN | 105368292 B * | 12/2017 |
| WO | 1996023602 | 8/1996 |

OTHER PUBLICATIONS

PCT/CN2017/107609, International Search Report dated Jul. 20, 2018.
PCT/CN2017/107609, Written Opinion of the International Searching Authority dated Jul. 20, 2018.
PCT/CN2017/107609, International Preliminary Report on Patentability dated Apr. 28, 2020.

* cited by examiner

*Primary Examiner* — Peter A Salamon

(57) ABSTRACT

The present invention provides a flexible wrapping material comprising a coolant gel composition comprising, i) at least one hydrophilic polyurethane prepolymer, ii) a coolant agent, iii) water, and iv) thermally conductive filler.

12 Claims, No Drawings

US 11,472,942 B2

FLEXIBLE WRAPPING MATERIAL FOR PRESERVING FOOD FRESHNESS

FIELD OF THE INVENTION

The present invention relates to a flexible wrapping material for preserving food freshness.

INTRODUCTION

Fast-freezing technique becomes more and more popular in high end food freshness preservation applications, such as in meats including beef, sea food, etc. The faster freezing speed can maintain more freshness of meats after freeze-thaw circles. In food industry, the freezing speed is indicated by the time of passing the maximum ice crystal generation zone (from −1 to −5° C.). Most liquid in the food would become ice crystal in this temperature range. With slower freezing speed, the cell sap would form bigger ice crystal to penetrate the cell membrane. It will lead to the cell sap or blood release during the freeze-thaw process. Such cell damage have significant impact on food freshness and mouthfeel. It motivated the innovation of fast-freezing technique to control the time of passing the maximum ice crystal generation zone. Cold air is the incumbent technology in refrigerators. Typically the time passing the maximum ice crystal generation zone (−1 to −5° C.) is around 200 mins. Currently in white goods market, the metal plate, like aluminum plate, is also assembled to accelerate the freezing speed. The metal plate plus cold air will speed up the freezing speed to 150 min.

There is still a need to further speed up the freezing speed.

SUMMARY OF THE INVENTION

The present invention provides a flexible wrapping material comprising a coolant gel composition comprising, i) at least one hydrophilic polyurethane prepolymer, ii) a coolant agent, iii) water, and iv) thermally conductive filler.

The weight ratio of component ii) coolant agent to component iii) water is from 15:85 to 50:50.

The weight ratio of component i) hydrophilic polyurethane prepolymer to the combination of component ii) coolant agent and component iii) water is from 1:30 to 1:5.

The weight percentage of the thermally conductive filler is from 10 to 75% by weight based on total weight of the coolant gel composition.

DETAILED DESCRIPTION OF THE INVENTION

In one embodiment of the invention, the hydrophilic polyurethane prepolymer is an isocyanate-terminated prepolymer, and is the reaction product of (a) polyether polyol having at least 30 wt. % of oxyethylene groups, and (b) a di-functional isocyanate composition selected from a pure diisocyanate, a composition of diisocyanates, and a composition of diisocyanate(s) and poly-functional isocyanate(s).

The term "pure diisocyanate" refers to only one kind of di-functional isocyanate without considering how many isomers this kind of di-functional isocyanate may comprise.

The term "composition of diisocyanate" refers to at least two kinds of different di-functional isocyanate without considering how many isomers each kind of di-functional isocyanate may comprise.

The term "poly-functional isocyanate" refers to isocyanates with at least three functionalities, such as tri-isocyanate.

In another embodiment of the invention, the polyether polyol has a nominal hydroxyl functionality of from 1.6 to 8, and a number average molecular weight of from 1,000 to 12,000.

In yet another embodiment of the invention, the hydrophilic polyurethane prepolymer has a free NCO content of from 1 to 5 wt. %, or from 1.5 to 3 wt. %, based on the total weight of the hydrophilic polyurethane prepolymer.

Suitable polyols and isocyanates are commercially available or can be prepared using standard processes known to those skilled in the art.

Examples of suitable di-functional isocyanates include but are not limited to isophorone diisocyanate, tolutene-2,4-diisocyanate, toluene-2,6-diisocyanate, mixtures of toluene-2,4- and 2,6-diisocyanate, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3'-diphenyl-4,4'-biphenylene diisocyanate, 4,4'-biphenylene diisocyanate, 4,4'-diphenylmethane diisocyanate, 3,3'-dichloro-4,4'-biphenylene diisocyanate, 1,6-hexamethylene diisocyanate, 1,4-tetramethylene diisocyanate, 1,10-decamethylene diisocyanate, cumene-2,4-diisocyanate, 1,5-naphthalene diisocyanate, methylene dicyclohexyl diisocyanate, 1,4-cyclohexylene diisocyanate, p-tetramethyl xylylene diisocyanate, p-phenylene diisocyanate, 4-methoxy-1,3-phenylene diisocyanate, 4-chloro-1,3-phenylene diisocyanate, 4-bromo-1,3-phenylene diisocyanate, 4-ethoxy-1,3-phenylene diisocyanate, 2,4-dimethylene-1,3-phenylene diisocyanate, 5,6-dimethyl-1,3-phenylene diisocyanate, 2,4-diisocyanatodiphenylether, 4,4'-diisocyanatodiphenylether, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilbene, dimethoxy-4,4'-diisocyanatodiphenyl, 1,4-anthracenediisocyanate, 2,5-fluorenediisocyanate, 1,8-naphthalene diisocyanate, 2,6-diisocyanatobenzfturan, and mixtures thereof.

Examples of suitable poly-functional isocyanates include but are not limited to 2,4,6-toluene triisocyanate, p,p',p"-triphenylmethane triisocyanate, trifunctional trimer of isophorone diisocyanate, trifunctional biuret of hexamethylene diisocyanate, trifunctional trimer of hexamethylene diisocyanate and polymeric 4,4'-diphenylmethane diisocyanate, and mixtures thereof.

In one embodiment of the invention, the polyether polyol and the diisocyanate are admixed at from 20 to 100° C., optionally in the presence of a urethane-forming catalyst such as a tin compound or a tertiary amine, for a time sufficient to form the hydrophilic polyurethane prepolymer. The ratio of the reactive functional groups of the polyol to the reactive functional groups of the isocyanate is sufficient to obtain the desired free NCO content, e.g. from 1 to 5 wt. %, in the prepolymer, and can be readily calculated by one skilled in the art in order to determine how much polyol and isocyanate to employ in the preparation of the prepolymer.

Conventional additives, such as additives known in the art for use in forming prepolymers and polyurethanes, may be used in the preparation of the hydrophilic polyurethane prepolymer. For example, the composition for forming the hydrophilic polyurethane prepolymer may include at least one catalyst, at least one crosslinker, and/or at least one chain extender. Further information on the preparation of the hydrophilic polyurethane prepolymer may be found in US 2006/0142529 and US 2015/0087737.

Suitable common catalysts are substances generally known in the art for promoting the reaction of isocyanate with a polyol and includes basic substances such as sodium bicarbonate or the tertiary amines and organometallic compounds. Illustrative examples of suitable catalysts include n-methyl morpholine, n-ethyl morpholine, trimethylamine, tetramethyl butane diamine, triethylenediamaine, dimethylaminoethanolamine, bezylidimethylamine, dibutyl tin dilaurate and stannous octoate.

Suitable examples of the crosslinker may include low molecular weight polyols typically having an average hydroxyl functionality of from 3 to 4, or low molecular weight amines having typically 3 or 4 amine moieties. Illustrative and preferred examples are glycerin, trimethylolpropane and low molecular weight alkoxylated derivatives thereof. Ethylene diamine is also commonly used although it is a less preferred amine crosslinking agent for use with the present invention. Such cross-linking agent may be present in an amount of from 0.1 to 5, preferably from 0.5 to 3 and more preferably from 1 to 3 percent of the total amount by weight of polyether polyol.

Suitable examples of the chain extender may include low molecular weight hydroxyl and amine terminated compounds with functionality of 2. Illustrative and preferred examples are diethylene glycol, 1,4-butanediol, 1,6-hexanediol, ethanolamine, diethanolamine, methyldiethanolamine, etc.

The polyether polyol advantageously is a polyoxypropylene-polyoxyethylene polyol having a number average molecular weight of from 3,000 g/mole to 9,000 g/mole and a polyoxyethylene content of at least 30 wt. %, based on a total weight of the polyoxyethylene-polyoxypropylene polyol. The polyoxypropylene-polyoxyethylene polyol may have a nominal hydroxyl functionality from 1.6 to 8.0, e.g., from 1.6 to 4.0. In one embodiment of the invention, the remainder of the weight content of the polyoxyethylene-polyoxypropylene polyol based on a total of 100 wt. % is accounted for with polyoxypropylene, e.g., the polyoxypropylene content is at least 5 wt. % in the polyol. For example, the polyoxyethylene content advantageously is from 55 wt. % to 85 wt. %, from 60 wt. % to 80 wt. %, from 65 wt. % to 80 wt. %, from 70 wt. % to 80 wt. %, and/or from 74 wt. % to 76 wt. %, with the remainder being polyoxypropylene.

The polyether polyol may include at least one other polyether polyol other than the polyoxypropylene-polyoxyethylene polyol. The at least one other polyether polyol may have an average nominal hydroxyl functionality from 1.6 to 8, e.g., from 1.6 to 4.0, and a number average molecular weight from 1000 to 12,000, e.g., from 1,000 to 8,000, from 1,200 to 6,000, from 2,000 to 5,500, etc. Further, combinations of optional amines, and other polyether polyols including monohydroxyl substances and low molecular weight diol and triol substances, of varying functionality and polyoxyethylene content may be used in the composition for preparing the hydrophilic polyurethane prepolymer.

The polyether polyol may also include polyethylene glycol (also known as PEG and polyoxyethylene glycol). The polyethylene glycol may have a weight average molecular weight from 500 g/mol to 2000 g/mol, e.g., from 500 g/mol to 1500 g/mol, from 750 g/mol to 1250 g/mol, from 900 g/mol to 1100 g/mol, etc.

Advantageously, a hydrophilic polyurethane prepolymer having a positive amount of less than 5 wt. %, or less than 3 wt. %, isocyanate groups are employed to prepare the coolant gel. In various embodiments of the invention, the hydrophilic polyurethane prepolymer has from 1 to 3 wt. %, from 1 to 5 wt. %, from 1.5 to 5 wt. %, or from 1.5 to 3 wt. %, free isocyanate groups. Advantageously, the hydrophilic polyurethane prepolymer is contacted with a stoichiometric excess of water to form the coolant gel. Mixtures of hydrophilic polyurethane prepolymers can be employed.

Various hydrophilic polyurethane prepolymers are known in the art. Useful prepolymers are available from The Dow Chemical Company under the HYPOL™ brand including, HYPOL™ JT6005 brand prepolymer and HYPOL™ 2060GS brand prepolymer. HYPOL™ JT6005 brand prepolymer is a TDI-based polyurethane prepolymer having an NCO content of 3.0% as determined by ASTM D 5155 and a viscosity at 23° C. of 12,000 mPa·s as determined by ASTM D 4889. HYPOL™ 2060GS brand prepolymer is a TDI-based polyurethane prepolymer having an NCO content of 3.0% as determined by ASTM D 5155 and a viscosity at 23° C. of 10,000 mPa·s as determined by ASTM D 4889.

The coolant agent can be organic or inorganic, preferably organic in this invention. Coolant agents are well known to those skilled in the art, and many are commercially available. Examples of the coolant agents include, but are not limited to, ethylene glycol, 1,3-propylene glycol, 1,2-propylene glycol, 1,3-butylene glycol, hexylene glycol, diethylene glycol, glycerin, water soluble polyol like polyethylene glycol, and any combination thereof. A mixture of coolant agents can be employed. In one embodiment of the invention, the weight ratio of component ii) coolant agent to component iii) water is from 12:88 to 60:40. Preferably it is from 15:85 to 50:50, more preferably from 20:80 to 40:60, and even more preferably from 25:75 to 35:65. In yet another embodiment, the weight ratio of component i) hydrophilic polyurethane prepolymer to the combination of component ii) coolant agent and component iii) water is from 1:33 to 1:5. Preferably it is from 1:30 to 1:5, more preferably from 1:25 to 1:8, and even more preferably from 1:20 to 1:10.

The thermally conductive filler useful in the invention is not particularly limited so long as the thermally conducting filler has a thermal conductivity of at least 5 W/(m·K) and preferably at least 10 W/(m·K). Useful thermally conductive fillers are selected from the group consisting of oxide powders, flakes and fibers composed of aluminum oxide (alumina), zinc oxide, magnesium oxide and silicon dioxide; nitride powders, flakes and fibers composed of boron nitride, aluminum nitride and silicon nitride; metal and metal alloy powders, flakes and fibers composed of gold, silver, aluminum, iron, copper, tin, tin base alloy used as lead-free solder; carbon fiber, graphite flakes or fibers; silicon carbide powder; and calcium fluoride powder; and the like. These fillers may be used independently, or a combination of two or more of them may be used. Preferred thermally conductive fillers are selected from the group consisting of silver, aluminum, aluminum oxide, magnesium oxide, boron nitride, graphite flakes or fibers; and an especially preferred thermally conducting filler are aluminum powder, flake or fiber. Thermally conductive fillers can have a broad particle size distribution. The particle size employed for these particles is not critical.

The weight percentage of the thermally conductive filler is from 10 to 75%, preferably from 10 to 60%, and more preferably from 15 to 50%, by weight based on total weight of the coolant gel composition.

The coolant gel composition may further comprises from 0.1 to 50% based on the total weight of the coolant gel composition, a phase-change materials.

Phase change materials (PCM) are latent thermal storage materials that are capable of absorbing and releasing high amounts of latent heat during melting and crystallization, respectively. The thermal energy transfer occurs when a material is transformed from a solid to a liquid phase or from a liquid to a solid phase. During such phase changes, the temperature of the PCM material remains nearly constant as does the space surrounding the PCM material, the heat flowing through the PCM being "entrapped" within the PCM itself. In this invention the phase change material has a phase change temperature of from about −25 to about −5° C. Further, the phase change material has a latent heat of enthalpy greater than about 50 kJ/kg. Useful phase change materials are selected from the group consisting of salt solution or gel, glycol solution or gel, organic paraffin, inorganic hydrate salt. Useful phase change materials are easily available in the market with different freezing points.

The coolant gel composition may further comprises from 0.1 to 2%, preferably from 0.1 to 1%, more preferably from 0.1 to 0.5%, by weight based on the total weight of the coolant gel composition, a water-dispersible isocyanate composition.

The water-dispersible isocyanate composition useful in the present invention may comprise an isocyanate compound and a modified isocyanate compound comprising at least one anionic group, at least one polyethylene oxide segment, or both an anionic group and a polyethylene oxide segment. In some embodiments, the water-dispersible isocyanate composition comprises the isocyanate compound, a modified isocyanate compound comprising the anionic group, and a modified compound comprising the polyethylene oxide segment. Suitable commercially available water-dispersible isocyanate composition include, for example, BAYHYDUR™ XP2487/1 hydrophilic aliphatic polyisocyanate based on hexamethylene dissocyanate available from Covestro AG.

The coolant gel composition is optionally further coupled with a barrier film to form the flexible wrapping material of the present invention.

A "barrier films" can be further prepared to pack the gel composition, which can improve the stability of the gel composition and reduce food contamination risks. The thickness of the barrier films is less than 5 mm. The film can be commercially available polyolefin films or metal foils. Furthermore, the barrier film can be also in-situ produced by spraying/coating polyolefin dispersion or solution on the gel surface. After evaporation of solvent or water, the polyolefin barrier film will be formed. The polyolefin film is made from the polymers or copolymers consisting of ethylene, vinyl alcohol, propene, butylene, octylene, etc. Suitable metal foils include aluminum, tin, and other metals foils can directly contact food, and include the laminated metal-polymer layers.

EXAMPLES

I. Raw Materials:

| Function | Ingredients | Supplier |
|---|---|---|
| Hydrophilic poly-urethane prepolymer | HYPOL ™ 2060G5 HYPOL ™ JT6005 | The Dow Chemical Company |
| Coolant agent | 1,2-propylene glycol glycerin 1,4-butylene glycol | Sinopharm Chemical Reagent Co., Ltd. |
| | CARBOWAX ™ poly-ethylene glycol 400 | The Dow Chemical Company |
| Thermally conductive filler | aluminum powder (400 mesh) aluminum powder (100 mesh) aluminum oxide (100 mesh) | Sinopharm Chemical Reagent Co., Ltd. |
| Phase change material | X007 (−10° C.) | Shenzhen Fresh Cold Chain Technology Co., Ltd. |
| Water-dispersible isocyanate composition | BAYHYDUR ™ XP2487/1 | Covestro AG |
| Barrier film | polyethylene film | Tuopu Daily Chemicals (China) Co., Ltd. |

II. Preparation

1. Coolant Gel Composition Preparation

Water and coolant agent were mixed together at suggested weight ratios. And then thermally conductive filler was added according to the formulation and dispersed by stirring. HYPOL™ product was added in the above dispersion and stirred. In order to tune the gel texture, a water-dispersible isocyanate like BAYHYDUR™ XP2487/1, might be added. The above dispersion was then poured into a 30*30 cm mold and left to form gel in several minutes. The formed gel was packaged with polyethylene film.

2. Coolant Gel With Phase Change Material Composition Preparation

The commercial phase change material (PCM) was packed in 12 bags and the 12 bags were discretely placed in the 30*30 cm mold (4 bags×3 rows). Then the gel composition after stirring was poured into the mode to form the gel. The PCM bags were placed in the gel matrix discretely, which enabled the gel to be folded after the PCM was frozen under low temperature.

III. Gel Formation Evaluation.

1. Coolant gel compositions comprising only components i) hydrophilic polyurethane prepolymer, ii) coolant agent, and iii) water were prepared with the below formulations as shown in Table 2 for gel formation evaluations. Only those formulations that may form gel and is soft at around −25° C. could be used in the present application.

TABLE 2

Gel Formation Evaluation

| | Coolant agent | | | | | | |
|---|---|---|---|---|---|---|---|
| (g) | propylene glycol | glycerin | butylene glycol | CARBOWAX polyethylene glycol 400 | water | HYPOL 2060GS | Gel (G) / Not (N) | Status (−25° C.) |
| 1 | 10 | | | | 90 | 5 | G | Rigid |
| 2 | 15 | | | | 85 | 5 | G | Soft |
| 3 | 15 | | | | 85 | 2.9 | N | — |
| 4 | 15 | | | | 85 | 3.3 | G | Soft |
| 5 | 15 | | | | 85 | 20 | G | Soft |
| 6 | 15 | | | | 85 | 25 | N | — |

TABLE 2-continued

Gel Formation Evaluation

| (g) | propylene glycol | glycerin | butylene glycol | CARBOWAX polyethylene glycol 400 | water | HYPOL 2060GS | Gel (G) / Not (N) | Status (−25° C.) |
|---|---|---|---|---|---|---|---|---|
| 7 | 75 | | | | 25 | 20 | G | Soft |
| 8 | 80 | | | | 20 | 20 | N | — |
| 9 | | 15 | | | 85 | 4 | G | Soft |
| 10 | | 20 | | | 80 | 4 | G | Soft |
| 11 | | 50 | | | 50 | 20 | G | Soft |
| 12 | | 67 | | | 33 | 20 | N | — |
| 13 | | | 15 | | 85 | 4 | G | Soft |
| 14 | | | 20 | | 80 | 4 | G | Soft |
| 15 | | | 50 | | 50 | 10 | G | Soft |
| 16 | | | 55 | | 45 | 20 | N | — |
| 17 | | | | 15 | 85 | 4 | G | Soft |
| 18 | | | | 20 | 80 | 4 | G | Soft |
| 19 | | | | 50 | 50 | 20 | G | Soft |
| 20 | | | | 60 | 40 | 20 | N | — |

Coolant gel compositions have to meet the following requirements to become a soft gel at around −25° C.

The weight ratio of component ii) coolant agent to component iii) water is from 15:85 to 50:50; and the weight ratio of component i) hydrophilic polyurethane prepolymer to the combination of component ii) coolant agent and component iii) water is from 1:30 to 1:5.

2. Performance Tests of Product Coolant Gel Compositions.

Coolant gel compositions having the following formulations (Table 3) are going through freezing speed measurement according to the below method.

TABLE 3

Coolant Gels formulation.

| (g) | water | propylene glycol | glycerin | HYPOL 2060GS | HYPOL JT6005 | BAYHYDUR® XP2487/1 | Al₂O₃ | Al (400) | Al (100) | PCM (−10° C.) |
|---|---|---|---|---|---|---|---|---|---|---|
| Gel-1 | 450 | 450 | | | 95 | | 5 | | | |
| Gel-2 | 570 | 290 | | 40 | | | 100 | | | |
| Gel-3 | 250 | 50 | | 10 | | | 690 | | | |
| Gel-4 | 570 | 290 | | 40 | | | | 100 | | |
| Gel-5 | 250 | 50 | | 10 | | 5 | 690 | | | 350 |
| Gel-6 | 570 | 290 | | 40 | | | | 100 | 200 | 650 |
| Gel-7 | 500 | | 200 | 100 | | | | | 200 | 500 |

Freezing Speed Measurement:

150 g DI water in a plastic bottle (D. 55 mm, H. 105 mm) was used to evaluate the freezing speed of different methods. A thermometer was equipped in the middle of plastic bottle to monitor the temperature change. In this experiment, the freezing point of DI water was −0.5° C. The temperature would maintain around −0.5° C. for a long time when crystallization is ongoing. Here, the time of temperature changing from 22° C. to −1° C. was recorded, and was used to evaluate the freezing speed. A refrigerator with series number of BL-186/241L from Shanghai Yisi Scientific Industry Co., Ltd. was used for the test.

One Control Example (CE-1) was a bottle of DI water placed on a plastic plate in the refrigerator's freezing cabinet, while the other Control Example (CE-2) was the bottle of DI water rolled up by the coolant gel-1 with less dosage of thermally conductive filler. Inventive Examples (IE) were bottles of DI water rolled up by the other coolant gels and placed on the same plastic plate in the same freezing cabinet.

Before test, the gels were placed in the freezing chamber for 24 hours to let the gels be fully cooled down. After frozen, the gel matrix can keep its softness at low temperatures, as the gel did not freeze in the freezing chamber environment (−25° C.). And then, the plastic bottle with DI water well balanced in 22° C. environment was used to evaluate the freezing efficiency—time passing 22° C. to −1° C. range.

Results are shown below in Table 4.

TABLE 4

Freezing efficiency

| Gel | Time passing 22° C. to −1° C. range (minutes) | Freezing Efficiency Compared to CE-1 |
|---|---|---|
| CE-1 | NA | 240 | 1.00 X |
| CE-2 | Gel-1 | 237 | 1.01 X |
| IE-1 | Gel-2 | 212 | 1.13 X |
| IE-2 | Gel-3 | 171 | 1.40 X |
| IE-3 | Gel-4 | 196 | 1.22 X |
| IE-4 | Gel-5 | 88 | 2.74 X |

TABLE 4-continued

Freezing efficiency

| Gel | | Time passing 22° C. to −1° C. range (minutes) | Freezing Efficiency Compared to CE-1 |
|---|---|---|---|
| IE-5 | Gel-6 | 81 | 2.95 X |
| IE-6 | Gel-7 | 120 | 2.00 X |

CE-1 was the typical method in the market to freeze food. The food was just placed in freezing chamber and frozen by cold air. CE-2 used a coolant gel composition with little thermally conductive filler, and its freezing efficiency is no significantly better than without using any gel. This indicated the important role that the thermally conductive filler played in the present application. Furthermore, with the increase in amount of the thermally conductive filler in the coolant gel composition, the freezing efficiency also improved, and reached its zenith at around 75 wt. % based on the total weight of the coolant gel composition. When the coolant gel compositions comprised phase change materials, their freezing efficiency were further improved, like IE-4 to IE-6.

What is claimed is:

1. A flexible wrapping material, comprising a coolant gel composition comprising, i) at least one hydrophilic polyurethane prepolymer, ii) a coolant agent, iii) water, and iv) thermally conductive filler;
    wherein a weight ratio of component ii) coolant agent to component iii) water is from 12:88 to 60:40;
    a weight ratio of component i) hydrophilic polyurethane prepolymer to a combination of component ii) coolant agent and component iii) water is from 1:33 to 1:5; and
    a weight percentage of the thermally conductive filler is from 10 to 75% by weight based on total weight of the coolant gel composition.

2. The flexible wrapping material according to claim 1, wherein the hydrophilic polyurethane prepolymer is an isocyanate-terminated prepolymer which is the reaction product of at least (a) a polyether polyol having at least 30 wt. % of oxyethylene groups, and (b) a bi-isocyanate composition that may be a composition of a pure di-isocyanate, of di-isocyanates, or of a di-isocyanate and a polyisocyanate.

3. The flexible wrapping material according to claim 2, wherein the polyether polyol has a nominal hydroxyl functionality of from 1.6 to 8, and a number average molecular weight of from 1,000 to 12,000.

4. The flexible wrapping material according to claim 1, wherein the hydrophilic polyurethane prepolymer has a free NCO content of from 1 to 5 wt. %, based on the weight of the prepolymer.

5. The flexible wrapping material according to claim 2, wherein the polyol is a polyoxypropylene-polyoxyethylene polyol having a number average molecular weight of from 3,000 g/mole to 9,000 g/mole and a polyoxyethylene content of at least 30 wt. %, based on total weight of the polyoxyethylene-polyoxypropylene polyol.

6. The flexible wrapping material according to claim 5, wherein the polyoxypropylene-polyoxyethylene polyol have a nominal hydroxyl functionality from 1.6 to 8.

7. The flexible wrapping material according to claim 1, wherein the coolant agent is selected from the group consisting of ethylene glycol, 1,2-propylene glycol, 1,3-propylene glycol, 1,4-butylene glycol, hexylene glycol, diethylene glycol, glycerin, water soluble polyol like polyethylene glycol, and any combination thereof.

8. The flexible wrapping material according to claim 1, wherein the thermally conductive filler has a thermal conductivity of at least 5 Wm·K.

9. The flexible wrapping material according to claim 1, wherein the coolant gel composition further comprises from 0.1 to 50%, based on the total weight of the coolant gel composition, of a phase-change material.

10. The flexible wrapping material according to claim 9, wherein the phase-change material has a phase change temperature of from −25 to −5° C., and a latent heat of enthalpy greater than about 50 kJ/kg.

11. The flexible wrapping material according to claim 1, wherein the coolant gel composition further comprises from 0.1 to 2%, based on the total weight of the coolant gel composition, of a water-dispersible isocyanate composition.

12. The flexible wrapping material according to claim 1, wherein the coolant gel composition is coupled with a barrier film to form the flexible wrapping material.

* * * * *